United States Patent
Hiroishi et al.

(10) Patent No.: US 11,466,145 B2
(45) Date of Patent: *Oct. 11, 2022

(54) CELLULOSE-FIBER-DISPERSING POLYOLEFIN RESIN COMPOSITE MATERIAL

(71) Applicant: FURUKAWA ELECTRIC CO., LTD., Tokyo (JP)

(72) Inventors: Jirou Hiroishi, Tokyo (JP); Hidekazu Hara, Tokyo (JP); Yuka Sawada, Tokyo (JP); Masami Tazuke, Tokyo (JP); Toshihiro Suzuki, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 143 days.

This patent is subject to a terminal disclaimer.

(21) Appl. No.: 16/797,938

(22) Filed: Feb. 21, 2020

(65) Prior Publication Data

US 2020/0190299 A1 Jun. 18, 2020

Related U.S. Application Data

(63) Continuation of application No. PCT/JP2018/031251, filed on Aug. 23, 2018.

(30) Foreign Application Priority Data

Aug. 23, 2017 (JP) .............................. JP2017-160680

(51) Int. Cl.
| | |
|---|---|
| *C08L 23/06* | (2006.01) |
| *C08K 3/08* | (2006.01) |
| *C08K 7/02* | (2006.01) |
| *C08L 23/12* | (2006.01) |
| *C08L 67/02* | (2006.01) |
| *C08L 79/06* | (2006.01) |
| *G01N 3/56* | (2006.01) |
| *C08L 1/02* | (2006.01) |

(52) U.S. Cl.
CPC ............... *C08L 23/06* (2013.01); *C08K 3/08* (2013.01); *C08K 7/02* (2013.01); *C08L 1/02* (2013.01); *C08L 23/12* (2013.01); *C08L 67/02* (2013.01); *C08L 79/06* (2013.01); *G01N 3/56* (2013.01); *C08K 2003/0812* (2013.01); *C08K 2201/004* (2013.01); *C08L 2205/16* (2013.01); *C08L 2207/066* (2013.01); *C08L 2207/20* (2013.01)

(58) Field of Classification Search
CPC .... C08K 3/08; C08K 7/02; C08K 2003/0812; C08K 2201/004; C08L 23/06; C08L 23/12; C08L 67/02; C08L 79/06; C08L 1/02; C08L 2205/16; C08L 2207/066; C08L 2207/20; G01N 3/56
See application file for complete search history.

(56) References Cited

U.S. PATENT DOCUMENTS

| | | |
|---|---|---|
| 4,332,748 A | 6/1982 | Fremont |
| 5,100,603 A | 3/1992 | Neefe |
| 5,120,776 A | 6/1992 | Raj et al. |
| 5,331,087 A | 7/1994 | Menges |
| 5,390,860 A | 2/1995 | Ali et al. |
| 5,759,680 A | 6/1998 | Brooks et al. |
| 2005/0084671 A1 | 4/2005 | Medoff et al. |
| 2007/0113705 A1 | 5/2007 | Szente et al. |
| 2008/0027161 A1 | 1/2008 | Schlosser et al. |
| 2009/0211303 A1 | 8/2009 | DiGiovanni et al. |
| 2014/0100332 A1 | 4/2014 | Henry et al. |
| 2014/0227605 A1 | 8/2014 | Nakamura et al. |
| 2014/0336309 A1 | 11/2014 | Sakata et al. |
| 2016/0002461 A1 | 1/2016 | Tsujii et al. |
| 2016/0244598 A1 | 8/2016 | Stanhope et al. |
| 2017/0080603 A1 | 3/2017 | Lovis et al. |
| 2017/0101489 A1 | 4/2017 | Gahleitner et al. |
| 2020/0010654 A1 | 1/2020 | Kim et al. |
| 2020/0062921 A1 | 2/2020 | Hara et al. |
| 2020/0079920 A1 | 3/2020 | Sawada et al. |
| 2020/0172684 A1 | 6/2020 | Hiroishi et al. |

FOREIGN PATENT DOCUMENTS

| | | |
|---|---|---|
| CN | 1278209 A | 12/2000 |
| CN | 1281390 A | 1/2001 |
| CN | 1637208 A | 7/2005 |
| CN | 1789557 A | 6/2006 |
| CN | 101054779 A | 10/2007 |
| CN | 102421852 A | 4/2012 |
| CN | 103144214 A | 6/2013 |
| CN | 103781831 A | 5/2014 |
| CN | 105026477 A | 11/2015 |
| CN | 105263708 A | 1/2016 |

(Continued)

OTHER PUBLICATIONS

Machine English translation of JP 2007-260941, Katsumi et al., Oct. 11, 2007.*

(Continued)

*Primary Examiner* — Patrick D Niland
(74) *Attorney, Agent, or Firm* — Birch, Stewart, Kolasch & Birch, LLP

(57) ABSTRACT

A cellulose-fiber-dispersing polyolefin resin composite material, containing a polyolefin resin and a cellulose fiber dispersed in the polyolefin resin, in which the composite material contains the cellulose fiber of 3 mass % or more and less than 70 mass %, and when the composite material is subjected to the abrasion test according to ISO 6722 under the following test conditions, the amount of abrasion after 5,000 reciprocations satisfies the [Formula 1]: (Amount of abrasion [mm] of the cellulose-fiber-dispersing polyolefin resin composite material)<−0.003×(Cellulose effective mass ratio of the cellulose-fiber-dispersing polyolefin resin composite material)+0.3,
[Test Conditions for Abrasion Test]
Load: 1.7 kg, Needle diameter: φ0.45 mm, Stroke length: 10 mm, Period: 60 reciprocations/min, Test piece: length 38 mm×width 6 mm×thickness 1 mm, Temperature: 23° C.

13 Claims, No Drawings

(56) References Cited

FOREIGN PATENT DOCUMENTS

| | | | |
|---|---|---|---|
| CN | 107708950 A | 2/2018 |
| CN | 110023399 A | 7/2019 |
| CN | 110023400 A | 7/2019 |
| CN | 110248993 A | 9/2019 |
| EP | 2 123 418 A1 | 11/2009 |
| EP | 2 296 858 A | 3/2011 |
| EP | 2 463 071 A1 | 6/2012 |
| EP | 2682421 A1 | 1/2014 |
| EP | 2 811 489 A1 | 12/2014 |
| EP | 3 441 425 A1 | 2/2019 |
| EP | 3 549 980 A1 | 10/2019 |
| EP | 3604424 A1 | 2/2020 |
| JP | 5-50427 A | 3/1993 |
| JP | 6-65883 A | 3/1994 |
| JP | 6-73231 A | 3/1994 |
| JP | 6-76644 A | 3/1994 |
| JP | 6-173182 A | 6/1994 |
| JP | 7-224192 A | 8/1995 |
| JP | 2000-62746 A | 2/2000 |
| JP | 2001-192508 A | 7/2001 |
| JP | 2004-58254 A | 2/2004 |
| JP | 2004-358423 A | 12/2004 |
| JP | 2006-347031 A | 12/2006 |
| JP | 2007-45863 A | 2/2007 |
| JP | 2007-98211 A | 4/2007 |
| JP | 2007-260941 A | 10/2007 |
| JP | 2009-274318 A | 11/2009 |
| JP | 2010-269544 A | 12/2010 |
| JP | 2011-93990 A | 5/2011 |
| JP | 4680000 B2 | 5/2011 |
| JP | 2011-116838 A | 6/2011 |
| JP | 2011-190322 A | 9/2011 |
| JP | 2011-219571 A | 11/2011 |
| JP | 4846405 B2 | 12/2011 |
| JP | 2012-82964 A | 4/2012 |
| JP | 4950939 B2 | 6/2012 |
| JP | 2013-18916 A | 1/2013 |
| JP | 2013-35272 A | 2/2013 |
| JP | 2013-161590 A | 8/2013 |
| JP | 2014-15512 A | 1/2014 |
| JP | 2015-183153 A | 10/2015 |
| JP | 2015-209439 A | 11/2015 |
| JP | 2016-20096 A | 2/2016 |
| JP | 2016-94538 A | 5/2016 |
| JP | 2017-128716 A | 7/2017 |
| JP | 2017-128717 A | 7/2017 |
| JP | 2017-145392 A | 8/2017 |
| JP | 2017-145393 A | 8/2017 |
| JP | 6210582 B2 | 10/2017 |
| JP | 6210583 B2 | 10/2017 |
| PL | 201466 B1 | 4/2009 |
| RU | 2526067 C1 | 8/2014 |
| WO | WO 98/47681 A1 | 10/1998 |
| WO | WO 99/11453 A1 | 3/1999 |
| WO | WO 99/19081 A1 | 4/1999 |
| WO | WO 00/78127 A1 | 12/2000 |
| WO | WO 2006/048332 A1 | 5/2006 |
| WO | WO 2007/130201 A1 | 11/2007 |
| WO | WO 2009/141796 A1 | 11/2009 |
| WO | WO 2014/153076 A1 | 9/2014 |
| WO | WO 2016/199942 A1 | 12/2016 |
| WO | WO 2018/105173 A1 | 6/2018 |
| WO | WO 2018/105174 A1 | 6/2018 |
| WO | WO 2018/180469 A1 | 10/2018 |
| WO | WO 2019/004206 A1 | 1/2019 |

OTHER PUBLICATIONS

Written Opinion of the International Searching Authority (form PCT/ISA/237), dated Nov. 20, 2018, for International Application No. PCT/JP2018/031251, with an English translation.
International Search Report for PCT/JP2018/031251 dated Nov. 20, 2018.
Extended European Search Report for European Application No. 18848639.3, dated Apr. 13, 2021.
Japanese Office Action for Japanese Application No. 2019-537695, dated Dec. 14, 2021, with an English translation.
Japanese Office Action for Japanese Application No. 2019-537696, dated Dec. 14, 2021, with an English translation.
Japanese Office Action for Japanese Application No. 2019-537697, dated Dec. 14, 2021, with an English translation.
U.S. Office Action for U.S. Appl. No. 16/466,276, dated Sep. 8, 2021.
Chinese Office Action and Search Report for Chinese Application No. 201780074788.2, dated May 21, 2021, with English translation.
Chinese Office Action and Search Report for Chinese Application No. 201780094074.8, dated Jun. 3, 2021, with English translation.
Chinese Office Action and Search Report for Chinese Application No. 201880053610.4, dated Dec. 28, 2021, with English translation.
Chinese Office Action and Search Report for Chinese Application No. 201880057926.0, dated Dec. 9, 2021, with English transiation.
Chinese Office Action and Search Report for Chinese Application No. 201880058045.0, dated Dec. 21, 2021, with English translation.
Chinese Office Action and Search Report, dated Jun. 2, 2021, for Chinese Application No. 201780094025.4, with English translation.
Chinese Office Action and Search Report, dated May 31, 2021, for Chinese Application No. 201780074783.X, with English transiation.
Data Sheet of Moplen EP500V, 2021, 2 pages total.
Deng et al., "Aquatic Product Marketing," Zhongyuan Farmers Press, 2016, p. 60 (2 pages total).
El-Sabbagh et al., "Flowability and Fiber Content Homogeneity of Natural Fiber Polypropylene Composites in Injection Molding," Proceedings of the Regional Conference Graz 2015—Polymer Processing Society PPS, 2015, pp. 060010-1-060010-5, 5 pages total.
Extended European Search Report for European Application No. 17844598.7, dated Dec. 6, 2019.
Extended European Search Report for European Application No. 17877541.7, dated Apr. 8, 2020.
Extended European Search Report for European Application No. 17922752.5, dated Mar. 1, 2021.
Extended European Search Report for European Application No. 17922753.3, dated Mar. 1, 2021.
Extended European Search Report for European Application No. 18847322.7, dated Apr. 12, 2021.
Extended European Search Report for European Application No. 18849169.0, dated Apr. 21, 2021.
International Preliminary Report on Patentability and English Translation of Written Opinion of the International Searching Authority dated Feb. 25, 2020. for PCT/JP2018/031250 (Forms PCT/IB/373 and PCT/ISA/237).
International Search Report for International Application No. PCT/JP2017/030214, dated Oct. 17, 2017.
International Search Report for International Application No. PCT/JP2017/030216, dated Nov. 7, 2017.
International Search Report for PCT/JP2017/030215 (PCT/ISA/210) dated Oct. 17, 2017.
International Search Report for PCT/JP2017/030217 dated Nov. 7, 2017.
International Search Report issued to PCT/JP2018/031249 (PCT/ISA/210), dated Nov. 13, 2018.
International Search Report issued in PCT/JP2018/031250 (PCT/ISA/210), dated Nov. 27. 2018.
Japanese Office Action for Japanese Application No. 2017-084664, dated Aug. 15, 2017, with English translation.
Japanese Office Action for Japanese Application No. 2017-004664, dated Feb. 14, 2017, with English translation.
Japanese Office Action for Japanese Application No. 2017-004665, dated Aug. 15, 2017, with English translation.
Japanese Office Action for Japanese Application No. 2017-004665, dated Feb. 14, 2017, with English translation.
Japanese Office Action for Japanese Appiication No. 2019-537491, dated Mar. 2, 2021, with English translation.
Japanese Office Actico for Japanese Application No. 2019-537492, dated Mar. 9, 2021, with English translation.

(56) References Cited

OTHER PUBLICATIONS

Jeremic, "Polyethylene," Ullmann's Encyclopedia of Industrial Chemistry, 2014, pp. 1-42.
Sanchez-Cadena et al., "Hot-pressed boards based on recycled high-density polyethylene tetrapack: Mechanical properties and fracture behavior," Journal of Reinforced Plastics and Composites, vol. 32, No. 23, 2013, pp. 1779-1792.
U.S. Corrected Notice of Allowance for U.S. Appl. No. 16/797,654, dated Feb. 11, 2022.
U.S. Notice of Allowance for U.S. Appl. No. 16/466,226, dated Feb. 7, 2022.
U.S. Notice of Allowance for U.S. Appl. No. 16/466,226, dated Oct. 27, 2021.
U.S. Notice of Allowance for U.S. Appl. No. 16/797,654, dated Jan. 10, 2022.
U.S. Notice of Allowance for U.S. Appl. No. 16/797,654, dated Jan. 27, 2022.
U.S. Notice of Allowance for U.S. Appl. No. 16/797,654, dated Sep. 7, 2021.
U.S. Office Action for U.S. Appl. No. 16/466,276, dated Apr. 13, 2021.
U.S. Office Action for U.S. Appl. No. 16/641,192, dated Nov. 19, 2021.
U.S. Office Action for U.S. Appl. No. 16/797,654, dated May 3, 2021.
U.S. Office Action for U.S. Appl. No. 16/797,691, dated Nov. 16, 2021.
U.S. Office Action for U.S. Appl. No. 16/466,276, dated Oct. 26, 2020.
Written Opinion of the International Searching Authority (Form PCT/ISA/237) for International Application No. PCT/JP2018/031249, dated Nov. 13, 2018, with an English translation.
U.S. Notice of Allowance for U.S. Appl. No. 16/641,192, dated Mar. 16, 2022.
U.S. Office Action for U.S. Appl. No. 16/466,276, dated Mar. 24, 2022.
U.S. Notice of Allowance for U.S. Appl. No. 16/466,226, dated Mar. 10, 2022.
U.S. Correced Notice of Allowance for U.S. Appl. No. 16/641,192, dated Apr. 13, 2022.
Espert et al., "Comparison of water absorption in natural cellulosic fibres from wood and one-year crops in polypropylene composites and its influence on their mechanical properties," Composites Part A: Applied Science and Manufacturing, vol. 35, 2004, pp. 1267-1276, 10 pages total.
European Communication pursuant to Rule 114(2) EPC for European Application No. 18849169.0, dated Mar. 9, 2022.
Law et al., "Water Absorption and Dimensional Stability of Short Kenaf Fiber-Filled Polypropylene Composites Treated with Maleated Polypropylene," Journal of Applie Polymer Science, vol. 120, 2011, pp. 563-572, 10 pages total.
U.S. Office Action for U.S. Appl. No. 16/641,134, dated Mar. 31, 2022.
Japanese Office Action for Japanese Application No. 2019-537697, dated May 24, 2022, with English translation.
"Equipment/Product Catalogue, Powder & Granule Technology Guide," Nippon Coke & Engineering Co., Ltd., 28 pages total.
Askanian et al, "Wood polypropylene composites prepared by thermally modified fibers at two extrusion speeds: mechanical and viscoelastic properties, " Holzforschung, vol. 69, No. 3, 2015, pp. 313-319.
Soroushian et al., "Research Trends in the Cellulose Reinforced Fibrous Concrete in USA," Proceedings of the Korea Concrete Institute Conference, 1997, pp. 3-23.
Written Submission of Publications for Japanese Application No. 2019-537697, dated Jul. 19, 2022, with English translation.

\* cited by examiner

CELLULOSE-FIBER-DISPERSING POLYOLEFIN RESIN COMPOSITE MATERIAL

CROSS-REFERENCE TO RELATED APPLICATIONS

This application is a Continuation of PCT International Application No. PCT/JP2018/031251 filed on Aug. 23, 2018, which claims priority under 35 U.S.C. § 119 (a) to Japanese Patent Application No. 2017-160680 filed in Japan on Aug. 23, 2017. Each of the above application is hereby expressly incorporated by reference, in its entirely, into the present application.

TECHNICAL FIELD

The present invention relates to a polyolefin resin composite material, in which a cellulose fiber is dispersed in a polyolefin resin.

BACKGROUND ART

Since polyolefin resins have excellent formability, and formed articles obtained using polyolefin resins have excellent mechanical characteristics, electrical characteristics, chemical resistance, and the like, polyolefin resins are widely used as constituent materials for formed articles (resin products). On the other hand, formed articles obtained using polyolefin resins tend to be easily abraded when used in, for example, a frictional environment involving a hard member such as a metal, and sufficient durability may not be obtained.

In order to improve the abrasion characteristics of polyolefin resins, it has been suggested to incorporate a high-molecular weight polyethylene (Patent Literature 1) or a polyphenylene ether-based resin (Patent Literature 2) into a polyolefin resin. Furthermore, it has also been suggested to increase abrasion resistance by incorporating polyphenylene ether, a silicone polymer, and the like into a polyolefin resin (Patent Literature 3).

CITATION LIST

Patent Literatures

Patent Literature 1: JP-A-6-76644 ("JP-A" means unexamined published Japanese patent application)
Patent Literature 2: JP-A-2013-161590
Patent Literature 3: JP-A-7-224192

SUMMARY OF INVENTION

Technical Problem

However, the resin components that are blended with the polyolefin resin in Patent Literatures 1 to 3 are all relatively expensive ones and have a problem with the production cost. Therefore, there is a demand for a technology of providing a polyolefin resin having desired abrasion resistance at lower cost.

The present invention provides a polyolefin resin material excellent in abrasion resistance, which can be prepared by further lowering the raw material cost.

Solution to Problem

The present inventors found that when a mixture including a polyolefin resin and cellulose fibers at a particular ratio is melt kneaded in the presence of water, the cellulose fibers can be uniformly dispersed in the polyolefin resin, and that a cellulose-fiber-dispersing polyolefin resin composite material thus obtainable exhibits excellent abrasion resistance. The present inventors continued to conduct further examination based on these findings, and have completed the present invention.

That is, the above-described problems of the present invention are solved by the following means.

[1]
A cellulose-fiber-dispersing polyolefin resin composite material, containing:
a polyolefin resin; and
a cellulose fiber dispersed in the polyolefin resin,
wherein the content of the cellulose fiber is 3 mass % or more and less than 70 mass %, and
wherein when the composite material is subjected to the abrasion test according to ISO 6722 under the following test conditions, the amount of abrasion after 5,000 reciprocations satisfies the following formula:

(Amount of abrasion [mm] of the cellulose-fiber-dispersing polyolefin resin composite material)<−0.003×(Cellulose effective mass ratio of the cellulose-fiber-dispersing polyolefin resin composite material)+0.3,  [Formula 1]

Test Conditions for Abrasion Test

Load: 1.7 kg, Needle diameter: φ0.45 mm, Stroke length: 10 mm, Period: 60 reciprocations/min, Test piece: length 38 mm×width 6 mm×thickness 1 mm, Temperature: 23° C.

[2]
The cellulose-fiber-dispersing polyolefin resin composite material described in the above item [1], wherein the content of the cellulose fiber in the cellulose-fiber-dispersing polyolefin resin composite material is 5 mass parts or more and less than 50 mass parts.

[3]
The cellulose-fiber-dispersing polyolefin resin composite material described in the above item [1] or [2], wherein the cellulose fiber contains a cellulose fiber having a fiber length of 0.3 mm or more.

[4]
The cellulose-fiber-dispersing polyolefin resin composite material described in any one of the above items [1] to [3], containing aluminum dispersed in the polyolefin resin.

[5]
The cellulose-fiber-dispersing polyolefin resin composite material described in any one of the above items [1] to [4], wherein a moisture content is less than 1 mass %.

[6]
The cellulose-fiber-dispersing polyolefin resin composite material described in any one of the above items [1] to [5], wherein the polyolefin resin is a polyethylene resin.

[7]
The cellulose-fiber-dispersing polyolefin resin composite material described in the above item [6], wherein the polyethylene resin is a low density polyethylene resin.

[8]
The cellulose-fiber-dispersing polyolefin resin composite material described in any one of the above items [1] to [5], wherein the polyolefin resin is a polypropylene resin.

[9]
A cellulose-fiber-dispersing polyolefin resin composite material, containing:
a polyolefin resin; and
a cellulose fiber dispersed in the polyolefin resin, wherein the content of the cellulose fiber is 3 mass % or more and less than 70 mass %, and wherein when the composite material is subjected to the abrasion test according to ISO 6722 under the following test conditions, the amount of abrasion after 5,000 reciprocations satisfies the following formula:

(Amount of abrasion [mm] of the cellulose-fiber-dispersing polyolefin resin composite material)/ (Amount of abrasion [mm] of the simple substance of the polyolefin resin composing the cellulose-fiber-dispersing polyolefin resin composite material)<−0.01×(Cellulose effective mass ratio of the cellulose-fiber-dispersing polyolefin resin composite material)+1, [Formula 2]

Test Conditions for Abrasion Test

Load: 1.7 kg, Needle diameter: φ0.45 mm, Stroke length: 10 mm, Period: 60 reciprocations/min, Test piece: length 38 mm×width 6 mm×thickness 1 mm, Temperature: 23° C.

[10]

The cellulose-fiber-dispersing polyolefin resin composite material described in the above item [9], wherein the content of the cellulose fiber in the cellulose-fiber-dispersing polyolefin resin composite material is 5 mass parts or more and less than 50 mass parts.

[11]

The cellulose-fiber-dispersing polyolefin resin composite material described in the above item [9] or [10], wherein the cellulose fiber contains a cellulose fiber having a fiber length of 0.3 mm or more.

[12]

The cellulose-fiber-dispersing polyolefin resin composite material described in any one of the above items [9] to [11], containing aluminum dispersed in the polyolefin resin.

[13]

The cellulose-fiber-dispersing polyolefin resin composite material described in any one of the above items [9] to [12], wherein a moisture content is less than 1 mass %.

[14]

The cellulose-fiber-dispersing polyolefin resin composite material described in any one of the above items [9] to [13], wherein the polyolefin resin is a polyethylene resin.

[15]

The cellulose-fiber-dispersing polyolefin resin composite material described in the above item [14], wherein the polyethylene resin is a low density polyethylene resin.

[16]

The cellulose-fiber-dispersing polyolefin resin composite material described in any one of the above items [9] to [13], wherein the polyolefin resin is a polypropylene resin.

In the present specification, the numerical range expressed by using the expression "to" means a range including numerical values before and after the expression "to" as the lower limit and the upper limit.

Advantageous Effects of Invention

The cellulose-fiber-dispersing polyolefin resin composite material of the present invention is excellent in abrasion resistance. In addition, the cellulose-fiber-dispersing polyolefin resin composite material of the present invention is can be prepared by further lowering the raw material cost.

MODE FOR CARRYING OUT THE INVENTION

Hereinafter, preferable embodiments of the present invention will be described in detail.

The cellulose-fiber-dispersing polyolefin resin composite material of the present invention (hereinafter, also simply referred to as "composite material of the present invention"; in a case where simply the term "composite material of the present invention" is used in the present specification, it means to include both of the embodiments I and II described below) is formed by dispersing a cellulose fiber in a polyolefin resin, and the content of the cellulose fiber is 3 mass % or more and less than 70 mass % in the composite material (meaning that the content is in 100 mass % of the dry mass of the composite material; hereinafter, the same).

In the composite material of the present invention, the cellulose fiber is dispersed in the polyolefin resin in an uniform state, and adaptability to extrusion molding, injection molding and the like is high. In addition, a predetermined amount of aluminum may be dispersed in the composite material of the present invention.

In an embodiment of the composite material of the present invention (hereinafter, also referred to as "embodiment I"), the amount of abrasion of the composite material of the present invention satisfies the following formula. In the embodiment I, the cellulose effective mass ratio described below of the composite material is preferably in the range of 5 to 50%.

The "amount of abrasion" (unit: mm) of the composite material means the amount of abrasion after 5,000 reciprocations, when a formed body having a length of 38 mm×a width of 6 mm×a thickness of 1 mm, which has been molded by press molding using the composite material, is subjected to the abrasion test according to ISO 6722 under the conditions of a load of 1.7 kg, a needle diameter of φ0.45 mm, a stroke length of 10 mm, a period of 60 reciprocations/min, and a temperature of 23° C. (the temperature in the atmosphere of the abrasion test is set to 23° C.; hereinafter, the same). The amount of abrasion is measured by the method described in Examples described below.

(Amount of abrasion [mm] of cellulose-fiber-dispersing polyolefin resin composite material)<− 0.003×(Cellulose effective mass ratio [mass %] of cellulose-fiber-dispersing polyolefin resin composite material)+0.3 [Formula 1]

Here, the cellulose effective mass ratio can be determined by performing a thermogravimetric analysis (TGA) from 23° C. to 400° C. at a heating rate of +10° C./min under a nitrogen atmosphere on a sample (10 mg) of a cellulose-fiber-dispersing polyolefin resin composite material adjusted to a dry state by drying the sample at 80° C. for one hour in an ambient atmosphere in advance, and by calculating the cellulose effective mass ratio according to the following formula.

(Cellulose effective mass ratio [%])=(loss of mass [mg] of a composite material sample from 270° C. to 390° C.)×100/(mass [mg] of a composite material sample in a dry state before being provided for the thermogravimetric analysis)

In order to decrease the amount of abrasion of the composite material, it is desirable to increase the effective mass ratio of the cellulose fiber in the composite material. However, when the content of the cellulose fiber is excessively large, integrity of the composite material is impaired. Therefore, from the viewpoint of maintaining the integrity of the composite material, it is desirable that the amount of abrasion is 0.001 mm or more, and more desirably 0.01 mm or more.

Further, in another embodiment of the composite material of the present invention (hereinafter, also referred to as "embodiment II"), the amount of abrasion of the composite material of the present invention satisfies the following formula.

(Amount of abrasion [mm] of cellulose-fiber-dispersing polyolefin resin composite material)/(Amount of abrasion [mm] of simple substance of polyolefin resin composing cellulose-fiber-dispersing polyolefin resin composite material) <−0.01×(Cellulose effective mass ratio of cellulose-fiber-dispersing polyolefin resin composite material)+1 [Formula 2]

In order to decrease the (Amount of abrasion [mm] of cellulose-fiber-dispersing polyolefin resin composite material)/(Amount of abrasion [mm] of simple substance of polyolefin resin composing cellulose-fiber-dispersing polyolefin resin composite material), it is desirable to increase the effective mass ratio of the cellulose fiber in the composite material. However, when the content of the cellulose fiber is excessively large, integrity of the composite material is impaired. Therefore, from the viewpoint of maintaining the integrity of the composite material, it is desirable that (Amount of abrasion [mm] of cellulose-fiber-dispersing polyolefin resin composite material)/(Amount of abrasion [mm] of simple substance of polyolefin resin composing cellulose-fiber-dispersing polyolefin resin composite material) is 0.01 or more, and more desirably 0.1 or more.

The amount of abrasion of the cellulose-fiber-dispersing polyolefin resin composite material and the amount of abrasion of the simple substance of the polyolefin resin composing the cellulose-fiber-dispersing polyolefin resin composite material can be measured as described above by the method described in Examples. Meanwhile, the "amount of abrasion of the simple substance of the polyolefin resin composing the cellulose-fiber-dispersing polyolefin resin composite material" is the amount of abrasion measured using a specimen prepared only from the polyolefin resin composing the composite material (in a case where the composite material includes a blend of a plurality of kinds of polyolefin resins, this blended resin).

The amount of abrasion of the composite material of the present invention in one embodiment satisfies the above-described Formula 1, and the amount of abrasion of the composite material of the present invention in another embodiment satisfies the above-described Formula 2. It is necessary for the composite material of the present invention that the amount of abrasion satisfies either Formula 1 described above or Formula 2 described above. It is also preferable that the composite material of the present invention is an embodiment in which the amount of abrasion satisfies Formula 1 described above and satisfies Formula 2 described above.

In the composite material of the present invention, the content of the cellulose fiber in the composite material is 3 mass % or more. The abrasion resistance can be further improved by making the content of the cellulose fiber in the composite material 3 mass % or more. From this point of view, the content of the cellulose fiber in the composite material is more preferably 5 mass % or more, and further preferably 10 mass % or more. In view of further improving the flexural strength, the content of the cellulose fiber in the composite material is preferably 25 mass % or more.

In the composite material of the present invention, the content of the cellulose fiber in the composite material is less than 70 mass %. If the content of the cellulose fiber in the composite material is 70 mass % or more, it will be difficult to obtain a composite material in which the cellulose fiber is uniformly dispersed by melt kneading. From the viewpoint of further suppressing the water absorption, the content of the cellulose fiber in the composite material is preferably less than 50 mass %.

In the composite material of the present invention, the content of the cellulose fiber is preferably 5 mass parts or more and less than 50 mass parts.

In the present invention, the content of the cellulose fiber in the composite material can be determined as the cellulose effective mass ratio described above. That is, based on the results of performing a thermogravimetric analysis (TGA) from 23° C. to 400° C. using a sample (10 mg) of the composite material that has been brought to a dry state by performing drying at 80° C.×1 hour in an air atmosphere in advance, at a rate of temperature increase of +10° C./min in a nitrogen atmosphere, the cellulose effective mass ratio calculated by the following formula is regarded as the content of the cellulose fiber in the present invention.

(Cellulose effective mass ratio [%])=(loss of mass [mg] of a composite material sample from 270° C. to 390° C.)×100/(mass [mg] of a composite material sample in a dry state before being provided for the thermogravimetric analysis)

The composite material of the present invention has excellent abrasion resistance. Therefore, the composite material is suitable as a constituent material for a formed article (resin product) used in an abrasive environment. The reason why the composite material of the present invention has excellent abrasion resistance is not sufficiently clear. However, it is speculated to be because breakaway in a frictional environment of highly strong cellulose fibers that seem to contribute to an enhancement of abrasion resistance is reduced by the embodiment in which cellulose fibers are uniformly dispersed in a polyolefin resin.

The cellulose fiber dispersed in the composite material of the present invention preferably contains a cellulose fiber having a fiber length of 0.3 mm or more. Mechanical strength such as the flexural strength can be further improved by containing the cellulose fiber having the fiber length of 0.3 mm or more.

Examples of the polyolefin of the polyolefin resin composing the composite material of the present invention includes polyethylene, polypropylene, and a mixture (blend) of polyethylene and polypropylene. Another examples thereof include an ethylene-series copolymer, such as an ethylene-vinyl acetate copolymer, an ethylene-ethyl acrylate copolymer, an ethylene-methyl methacrylate copolymer, an ethylene-acrylic acid copolymer, an ethylene-methacrylic acid copolymer, and an ethylene-glycidyl methacrylate copolymer; and a material containing these. The polyolefin resins may be used singly, or two or more kinds thereof may be used in combination. The polyolefin resin composing the composite material of the present invention is preferably a polyethylene resin and/or a polypropylene resin, more preferably a polyethylene resin.

Examples of the polyethylene resin include a low density polyethylene (LDPE) and a high density polyethylene (HDPE). The polyethylene resin is preferably a low density polyethylene.

The above-described low density polyethylene means polyethylene having a density of 880 kg/m$^3$ or more and less than 940 kg/m$^3$. The above-described high density polyethylene means polyethylene having a density larger than the density of the above-described low density polyethylene.

The low density polyethylene may be so-called "low density polyethylene" and "ultralow density polyethylene" each having long chain branching, or linear low density polyethylene (LLDPE) in which ethylene and a small amount of α-olefin monomer are copolymerized, or further may be "ethylene-α-olefin copolymer elastomer" involved in the above-described density range.

In the composite material of the present invention, the content of the polyolefin resin in the composite material is preferably 20 mass % or more and 97 mass % or less, more preferably 30 mass % or more and 95 mass % or less, and further preferably 40 mass % or more and 90 mass % or less.

Furthermore, as an embodiment of the composite material of the present invention, it is also preferable to employ an embodiment in which the composite material contains, for example, a polypropylene resin in addition to the polyethylene resin. In this case, the content of the polypropylene resin in the composite material can be adjusted to, for example, 17 mass % or less (that is, the content of the polypropylene resin can be adjusted to 20 mass parts or less with respect to a total content of 100 mass parts of the polyethylene resin and the cellulose fiber). Furthermore, according to another embodiment in which the composite material of the present invention contains a polyethylene resin and a polypropylene resin, the content of this polypropylene resin can be adjusted to a level of 35 mass % or more and 95 mass % or less in the composite material, and it is also preferable that the content is adjusted to a level of 40 mass % or more and 90 mass % or less.

It is also preferable that the composite material of the present invention is an embodiment in which aluminum is dispersed in the polyolefin resin, in addition to the cellulose fiber.

When the aluminum is dispersed, the content of the aluminum in the composite material is preferably 1 mass % or more and 30 mass % or less. When the content of aluminum is adjusted to a level within this range, processability of the composite material can be further increased, and it is more difficult for lumps of aluminum to be produced at the time of processing of the composite material.

The content (mass %) of the polyolefin resin and the content (mass %) of aluminum in the composite material of the present invention can be determined as follows.

The content (mass %) of the polyolefin resin in the composite material of the present invention can be obtained from the following formula as the soluble mass ratio to hot xylene Ga (%). The method for determining the soluble mass ratio to hot xylene will be described later.

$$Ga[\text{mass \%}] = \{(W0 - Wa)/W0\} \times 100$$

W0: dry mass of a composite material before being immersed into hot xylene
Wa: mass of a composite material after being immersed into hot xylene at 138° C. and then drying and removing xylene Here, in a case where the composite material is composed of a polyolefin resin, cellulose fibers, and another component such as aluminum, the content (mass %) of the other component such as aluminum in the composite material is expressed as follows.

Content of other components such as aluminum (mass %)=100−{(cellulose effective mass ratio (mass %)+content of polyolefin resin (mass %)}

When the composite material does not contain any component other than cellulose fibers, polyolefin resins, and aluminum, or if contains, only to a negligible extent, the content (mass %) of aluminum in the composite material is expressed as follows.

Content of aluminum(mass %)=100−{(cellulose effective mass ratio(mass %)+content of polyolefin resin (mass %)}

In a case where the polyolefin resin is derived only from a polyolefin thin film piece formed by causing cellulose fibers to adhere thereto as will be described below, the content of the polyolefin resin in the polyolefin thin film piece can be determined on the basis of the soluble mass ratio to hot xylene, and the content can be regarded as the content of the polyolefin resin in the composite material. Similarly, the content of aluminum in the polyolefin thin film piece can be regarded as the content of aluminum in the composite material.

Soluble Mass Ratio to Hot Xylene

When a kind of the resin that may be mixed into the composite material is known, an amount of each resin can be determined based on a soluble mass ratio to hot xylene for the composite material.

The soluble mass ratio to hot xylene is determined as described below in the present invention.

In accordance with measurement of a degree of cross-linking in JASO D 618 as the standard for automotive electrical cables, 0.1 to 1 g is cut out from a molded sheet of the composite material and taken as a sample, and this sample is wrapped with a 400-mesh stainless steel mesh, and immersed into 100 mL of xylene at a predetermined temperature for 24 hours. Next, the sample is pulled up therefrom and is dried in vacuum at 80° C. for 24 hours. From the mass of the sample before and after the test, the soluble mass ratio to hot xylene G (%) is calculated according to the following formula:

$$G = \{(W0 - W)/W0\} \times 100$$

where,
W0 is mass of a dry composite material before being immersed into hot xylene, and
W is mass of a composite material after being immersed into hot xylene and then drying and removing xylene.

For example, a case where the polyolefin resin composing the composite material is composed of the polyethylene resin and the polypropylene resin is assumed. When a soluble mass ratio to hot xylene of 138° C. for the composite material is taken as Ga (%), and a soluble mass ratio to hot xylene of 105° C. for the composite material is taken as Gb (%), a term: Ga corresponds to a mass ratio (%) of the polyolefin resin, Ga-Gb corresponds to a mass ratio (%) of the polypropylene resin and Gb corresponds to a mass ratio (%) of the polyethylene.

That is, the amount of the polyolefin resin in the composite material can be determined as the soluble mass ratio to hot xylene of 138° C. Ga (%).

Herein, $$Ga = \{(W0 - Wa)/W0\} \times 100$$

$$Gb = \{(W0 - Wb)/W0\} \times 100$$

where,
W0 is mass of a dry composite material before being immersed into hot xylene,
Wa is mass of a composite material after being immersed into hot xylene of 138° C. and then drying and removing xylene, and
Wb is mass of a composite material after being immersed into hot xylene of 105° C. and then drying and removing xylene.

Further, the composite material of the present invention may contain a resin component other than the polyolefin resin such as the polyethylene resin and the polypropylene resin. Moreover, the composite material of the present invention may contain polyethylene terephthalate and/or nylon, for example. In this case, it is preferable that the composite material contains polyethylene terephthalate and/or nylon, and a total content of polyethylene terephthalate and/or nylon is 10 mass parts or less based on the total content of 100 mass parts of the polyolefin resin and the cellulose fiber. Moreover, when the polyethylene resin is used as the polyolefin resin, it is preferable that the composite material contains polyethylene terephthalate and/or nylon, and a total content of polyethylene terephthalate and/or nylon is 10 mass parts or less based on the total content of 100 mass parts of the polyethylene resin and the cellulose fiber. Here, the "total content of polyethylene terephthalate and/or nylon" means a content of one kind when the composite material contains either polyethylene terephthalate or nylon, or means a total content of polyethylene terephthalate and nylon when the composite material contains both polyethylene terephthalate and nylon.

The composite material of the present invention has a flexural strength of preferably 10 to 40 MPa, more preferably 15 to 40 MPa. By having such physical properties, the composite material can be used even for use applications where strength is required.

The composite material of the present invention has a flexural modulus of preferably 1000 to 4000 MPa, more preferably 1500 to 4000 MPa. By having such physical properties, the composite material can be used even for use applications where flexural rigidity is required.

The flexural strength and the flexural modulus of the composite material can be measured by forming the composite material into a specific shape. More specifically, the flexural strength and the flexural modulus are measured by the method described in Examples to be mentioned later.

At least a part of the above-described olefin resin, such as the polyethylene resin and the polypropylene, and the cellulose composing the composite material of the present invention is preferably derived from a recycled material. Furthermore, also regarding the aluminum, polyethylene terephthalate, and/or nylon that can be included in the composite material of the present invention, it is preferable that at least a portion of these are derived from a recycled material. When a recycled material is utilized, the production cost for the composite material can be suppressed.

Specific examples of this recycled material include a polyolefin laminated paper having paper and a polyolefin thin film layer; a polyolefin laminated paper having paper, a polyolefin thin film layer and an aluminum thin film layer; and a beverage/food pack formed of any of these.

More preferably, it is preferable to use, as a recycled material, a polyolefin thin film piece formed by causing cellulose fibers to adhere thereto (hereinafter, also referred to as "cellulose-fiber-adhering polyolefin thin film piece"), which is obtained by treating the laminated paper and/or a beverage/food pack as described above with a pulper and stripping off the paper portion. In a case where the laminated paper and the beverage/food pack have an aluminum thin film layer, in the cellulose-fiber-adhering polyolefin thin film piece described above, aluminum is also in an attached state.

Even in a case where such a recycled material is used as a raw material, cellulose fibers are uniformly dispersed in a resin by employing a method of performing melt kneading in the presence of water as will be described below, and the composite material of the present invention having physical properties with excellent abrasion resistance can be obtained.

In the composite material of the present invention, a moisture content is preferably less than 1 mass %. As mentioned later, the composite material of the present invention can be produced by the melt-kneading a resin-containing raw material in the presence of water. Therefore, the composite material of the present invention can be obtained by, for example, using the above-mentioned cellulose-fiber-adhering polyolefin thin film piece containing a large amount of moisture as a raw material, and melt kneading this in a state including water. Through this melt kneading, water can be removed as vapor, and the moisture content of the composite material thus obtainable can be reduced to a level less than 1 mass %. Accordingly, when a cellulose-fiber-adhering polyolefin thin film piece containing moisture is used as a raw material, in comparison with a case where removal of the moisture and the melt-kneading are performed as different processes, energy consumption (power consumption or the like) required for the removal of the moisture can be significantly suppressed.

The above-described moisture content means a loss of mass (mass %) upon performing a thermogravimetric analysis (TGA) from 23° C. to 120° C. at a heating rate of +10° C./min under a nitrogen atmosphere within 6 hours after production of a composite material.

The composite material of the present invention may contain an inorganic material. Flexural modulus, impact resistance and flame retardancy may be improved by containing the inorganic material. Specific examples of the inorganic material include calcium carbonate, talc, clay, magnesium oxide, aluminum hydroxide, magnesium hydroxide and titanium oxide.

The composite material of the present invention may contain a fibrous material other than the cellulose fiber. Examples of the fibrous material other than the cellulose fiber include a glass fiber, a ceramics fiber, a carbon fiber, and a resin fiber other than the cellulose fiber. Examples of the resin fiber other than the cellulose fiber include an aramid fiber, and a poly(p-phenylenebenzobisoxazole) (PBO) fiber. Preferred examples of the glass fiber include a chopped strand and a milled fiber.

The composite material of the present invention may contain a flame retardant, an antioxidant, a stabilizer, a weathering agent, a compatibilizer, an impact improver, a modifier, or the like according to the purpose. In addition, the composite material of the present invention can contain also an oil component or various additives for improving processability. Specific examples thereof include paraffin, modified polyethylene wax, stearate, hydroxy stearate, a vinylidene fluoride-based copolymer such as a vinylidene fluoride-hexafluoropropylene copolymer, and organic-modified siloxane.

The composite material of the present invention can also contain carbon black, various pigments and dyes. The composite material of the present invention can also contain a metallic luster colorant. The composite material of the present invention can also contain an electrical conductivity-imparting component such as electrically conductive carbon black other than aluminum. The composite material of the present invention can also contain a thermal conductivity-imparting component other than aluminum.

The composite material of the present invention may be crosslinked. Examples of the crosslinking agent include organic peroxide, and specific examples include dicumyl peroxide. The composite material of the present invention may be in a crosslinked form by a silane crosslinking method.

The shape of the composite material of the present invention is not particularly limited. For example, the composite material of the present invention can be formed into a pellet form, and the composite material of the present invention may be a formed article. In a case where the composite material of the present invention is in a pellet form, this pellet is suitable as a constituent material of a formed article (resin product).

Subsequently, with regard to the production method for the composite material of the present invention, a preferable embodiment will be described below. The composite material of the present invention is not limited to a composite material obtained by the following method, as long as the composite material satisfies the requirements of the present invention.

In a preferred embodiment of a method of producing the composite material of the present invention, the polyolefin resin and the cellulose fiber are melt kneaded in the presence of water. More preferably, the composite material of the present invention can be obtained by melt-kneading the above-described cellulose-fiber-adhering polyolefin thin film piece in the presence of water.

Melt-Kneading

In the production method described above, a cellulose-fiber-dispersing polyolefin resin composite material is obtained by conducting the melt-kneading in the presence of water. Examples of a kneading device used in the melt-kneading include a batch type closed kneading device and a kneader.

Here, a term "melt-kneading" means to conduct the kneading at a temperature at which the polyolefin resin in the raw material is melted. The melt-kneading is preferably performed at a temperature at which the cellulose fiber is not deteriorated. An expression "the cellulose fiber is not deteriorated" means that the cellulose fiber does not cause significant discoloration, burning or carbonization.

A temperature in the above-described melt-kneading (temperature of the melt-kneaded material) is preferably adjusted to 110 to 280° C., and further preferably 130 to 220° C.

When melt-kneading is performed in the presence of water, a solid fixed state or a thermally fused state of cellulose fibers can be efficiently loosened by loading of shear force and the action of hot water (including physical action and chemical action (hydrolysis action) by hot water), and the network-like entanglement between cellulose fibers can also be effectively loosened. Thus, cellulose fibers can be uniformly dispersed in the polyolefin resin.

In a case where the raw material to be melt-kneaded includes aluminum, hot water also acts on aluminum, and production of hydrated oxide on the surface of aluminum or dissolution of the surface is accelerated. In particular, when a hydrogen ion concentration (pH) is shifted from the neutrality, dissolution action increases. It is considered that the shear force by the melt-kneading and a reaction of the hot water with aluminum act thereon in a multiple manner, aluminum is micronized, and the composite material having uniform physical properties can be obtained. Moreover, in micronization of aluminum and formation of hydrated oxide on the surface thereof to be promoted by the shear force and the hot water, accordingly as the aluminum is further micronized, the surface area increases, resulting in increasing an amount of the hydrated oxide on the surface of aluminum. It is considered that this phenomenon advantageously works also in improving the flame retardancy of the composite material.

When the cellulose-fiber-adhering polyolefin thin film piece is used as the raw material of the composite material, pH of water (hot water) ordinarily shows a value on an alkaline side in a state of performing the melt-kneading as described above. The pH of water in the state of performing the melt-kneading is preferably in the range of 7.5 to 10, and also preferably in the range of 7.5 to 9. When the water shows alkalinity, the aluminum and the water react with each other and the aluminum is easily dissolved thereinto, and uniform dispersibility in the polyolefin resin can be further enhanced.

Moreover, in the state of performing the melt-kneading as described above, the pH of the water may be adjusted to a value on an acid side (preferably pH to 4 to 6.5, and further preferably pH to 5 to 6.5). Also in this case, the aluminum and the water react with each other and the aluminum is easily dissolved thereinto, and the uniform dispersibility in the polyolefin resin can be further enhanced. However, when the pH is on the acid side, particularly a metal part of a melt-kneading device or each device used for production may be damaged. From this point, the pH showing the value on the alkaline side is preferable.

The hot water may be turned into water in the subcritical state. Here, "water in the subcritical state" means water which is in a high temperature and high pressure state, and does not reach a critical point of water (temperature: 374° C. and pressure: 22 MPa), and more specifically, is in a state in which the temperature is equal to or more than a boiling point (100° C.) of water, the temperature and the pressure each are equal to or less than the critical point of water, and the pressure is at least near a saturated water vapor pressure.

In the water in the subcritical state, an ionic product becomes larger than the ionic product of water under an atmospheric pressure at 0° C. or more and 100° C. or less, and it is assumed that the water in the subcritical state causes weakening of intermolecular bonding of the cellulose fibers, and defibration of the cellulose fibers is promoted. Moreover, it is considered that the water in the subcritical state has higher reactivity with the aluminum and can further enhance the micronization and the uniform dispersibility of the aluminum.

The melt-kneading is preferably performed using a batch type closed kneading device having a stirring blade in the presence of water.

Melt-kneading using a batch type closed kneading device having a stirring blade can perform melt-kneading at an increased temperature in a space by, for example, introducing raw materials including cellulose fibers and a polyolefin resin, and water into a closed space, and vigorously kneading the raw materials and water by rotating the stirring blade at a high speed within such a closed space. In addition, a term "closed" in the present invention is used in the meaning of a space which is closed from outside, but is not in a completely closed state. That is, as described above, the closed space means the space provided with a mechanism according to which, when the raw material and water are intensively kneaded in the closed space, the temperature and the pressure rise, but the vapor is discharged to outside under such a high temperature and a pressure. Accordingly, while the melt-kneading in the presence of water in the subcritical state is achieved by intensively kneading the raw material and water in the closed space, the moisture is continuously discharged to outside as the vapor. Therefore, the moisture can be finally significantly reduced, or can be substantially completely removed.

Moreover, the melt-kneading can be performed by setting the temperature to a level equal to or more than a melting temperature of the polyolefin resin by using a kneader being a batch type non-closed kneading device having a stirring blade. In a similar manner in this case also, the moisture can be vaporized while the melt-kneading is performed.

When the cellulose-fiber-adhering polyolefin thin film piece is used as the raw material, as mentioned above, this raw material contains a large amount of water upon separation treatment with the paper portion, and has been hard to be recycled also when consumed energy required for recycling or the like is taken into consideration. However, according to the production method described above, water is necessary in order to melt knead the thin film piece in the presence of water. Accordingly, the large amount of absorbed water in the thin film piece does not matter at all, and rather there is an advantage of capability of reducing a labor hour of adding the water thereto. Furthermore, the moisture can be effectively discharged therefrom as high temperature vapor in the melt-kneading. Therefore, the moisture content of the composite material obtained can be reduced to a desired level.

As the above-mentioned batch type closed kneading device having a stirring blade, for example, a batch type high-speed agitating device including a cylindrical agitating chamber and having a structure in which a plurality of stirring blades is provided to protrude on the outer periphery of the rotary shaft that is disposed to pass through the interior of the agitating chamber, can be used. Moreover, for example, this batch type high-speed agitating device is provided with a mechanism according to which water vapor is released while the pressure in the agitation chamber is retained.

The temperature and pressure in the agitating chamber rapidly increase when high shear force is added to the raw materials and water by the rotating stirring blades, the water having high temperature acts physically and chemically (hydrolysis) on cellulose and defibrates the cellulose fibers in cooperation with strong shear force caused by high-speed stirring. Furthermore, in a case where the raw materials include aluminum, a reaction between the hot water and aluminum occurs, and it is considered that a composite material having a uniform composition or physical properties can be obtained.

As described above, the above-described batch type closed kneading device is provided with the cylindrical agitation chamber, and the plurality of stirring blades (for example, 4 to 8 blades) are projected on the outer periphery of the rotary shaft arranged by passing through the agitation chamber. The rotary shaft on which the stirring blades are arranged is connected to a motor being a drive source. Here, the temperature and the pressure are measured by a thermometer and a pressure gauge attached inside the agitation chamber, a melted state of the material is judged by using the temperature and the pressure measured from the thermometer and the pressure gauge, and the melt-kneading can be judged. Moreover, the melted state can also be judged by measuring rotating torque applied to the motor, without judging from the temperature and the pressure. For example, an end time point of the melt-kneading can also be judged by measuring a change in the rotating torque of the rotary shaft to be measured from a torque meter. In the melt-kneading, the stirring blades are rotated with a high speed. A peripheral speed (rotating speed) of the stirring blade is preferably 20 to 50 m/sec as a peripheral speed at a leading edge of the stirring blade (leading edge portion farthest from the rotary shaft).

The end time point of the melt-kneading using the batch type closed kneading device can be appropriately adjusted by taking the physical properties of the composite material to be obtained into consideration. Preferably, it is preferable to stop the rotation of the rotary shaft within 30 seconds from the time point at which the rotating torque of the rotary shaft of the batch type closed kneading device rises, reaches a maximum value, and then falls, and after the torque reaches 0.7 times the maximum value, the torque change rate reaches 5% or less per second. Thus, the melt flow rate (MFR: temperature=230° C.; load=5 kgf) of the composite material to be obtained is easily adjusted to 0.05 to 50.0 g/10 min, and the physical properties can be further improved. In the composite material having the melt flow rate within the above-described range, the cellulose fibers are uniformly dispersed in the resin, the composite material is preferable for extrusion molding or injection molding, and a formed body having high shape stability, high strength, and high impact resistance can be prepared.

The reason why the melt flow rate of the composite material can be adjusted by controlling the end time point of the melt-kneading is estimated, as a contributory factor, that a part of the molecules of the polyolefin resin and the cellulose fiber is decomposed into low-molecular weight components by action of the hot water and the water in the subcritical state produced during the melt-kneading.

In the present description, a term "torque change rate reaches 5% per one second" means that torque T1 at a predetermined time and torque T2 after one second from the predetermined time satisfies the following expression (T):

$$100\times(T1-T2)/T1 \leq 5(\%). \qquad \text{Expression } (T):$$

In particularly, in the melt-kneading, when the raw material and water are charged into the batch type kneading device or a kneader, the raw material may be pulverized or subjected to volume reduction treatment according to necessity and treated into the size and bulk density facilitating to perform self-weight fall charge or the like and handling. Here, "the volume reduction treatment" means treatment according to which the thin film piece is compressed to reduce a bulk volume, in which the moisture adhered to the thin film piece beyond necessity is also squeezed out by the compression on this occasion. The moisture adhered to the thin film piece beyond necessity can be squeezed out, and energy efficiency until the composite material is obtained can be further improved by applying the volume reduction treatment thereto.

In this cellulose-fiber-adhering polyolefin thin film piece obtained by the treatment using the pulper, the moisture content ordinarily reaches around 50 mass %, and the thin film piece is in a state in which a large amount of water is absorbed. In such a cellulose-fiber-adhering polyolefin thin film piece in the state of absorbing water, the moisture is squeezed by the volume reduction treatment, and the moisture content reaches around 20 mass %, for example. Moreover, an apparent volume is preferably adjusted to ½ to ⅕ by this volume reduction treatment. The device used in the volume reduction treatment is not particularly limited, but an extrusion system volume reduction machine having two screws is preferable. The thin film piece can be continuously treated, and simultaneously a volume-reduced material which is easily handled in a subsequent step, and is properly small in individual sizes can be obtained by using the extrusion system volume reduction machine having two screws. For example, DUAL PRETISER (model: DP-3N, manufactured by Oguma Iron Works Co., Inc.) or the like can be used.

Moreover, the cellulose-fiber-adhering polyolefin thin film piece in the state of absorbing water is pulverized, and this pulverized material can also be melt kneaded. Pulverizing treatment can be performed by using a pulverizer having a rotary blade, a pulverizer having a rotary blade and a fixed blade, and a pulverizer having a sliding blade, for example.

As the water to be used upon the melt-kneading, as described above, cellulose fiber-impregnated water adhered to the cellulose-fiber-adhering polyolefin thin film piece, or water adhered to the surface of the thin film piece, or the like can be directly used. Furthermore, in a case where the raw materials are not in a state of having absorbed water, a necessary amount of water may be added.

The amount of water necessary upon the melt-kneading is ordinarily 5 mass parts or more and less than 150 mass parts based on 100 mass parts (dry mass) of the cellulose-fiber-adhering polyolefin thin film piece. The composite material in which the cellulose fibers are uniformly dispersed in the resin, the moisture content is less than 1 mass %, and has excellent formability is easily produced by adjusting the water to this range of the amount of water. The amount of water upon the melt-kneading is further preferably 5 to 120 mass parts, still further preferably 5 to 100 mass parts, still further preferably 5 to 80 mass parts, and still further preferably adjusted to 10 to 25 mass parts, based on 100 mass parts (dry mass) of the cellulose-fiber-adhering polyolefin thin film piece.

According to the production method described above, in performing the melt-kneading, a cellulose material can be further mixed therein.

In this case, a blending amount of the cellulose material is adjusted in such a manner that a proportion of the cellulose fiber becomes preferably 3 mass % or more and less than 70 mass %, more preferably 5 mass % or more and less than 70 mass %, further preferably 5 mass % or more and less than 50 mass %, and particularly preferably 25 mass % or more and less than 50 mass %, to 100 mass % of the composite material obtained.

Examples of the cellulose material include a material mainly containing cellulose, and more specifically, specific examples thereof include paper, waste paper, paper powder, regenerated pulp, paper sludge and broken paper of laminated paper. Above all, in view of cost and effective use of resources, waste paper and/or paper sludge is preferably used, and paper sludge is further preferably used. This paper sludge may contain an inorganic material in addition to the cellulose fiber. From a viewpoint of enhancing elastic modulus of the composite material, paper sludge containing an inorganic material is preferable. Moreover, when impact strength of the composite material is emphasized, as the paper sludge, a material without containing an inorganic material, or a material having a small content, even if the material contains the inorganic material, is preferable. When the paper such as the waste paper is mixed therein, the paper is preferably wetted with the water in advance before the melt-kneading. The composite material in which the cellulose fibers are uniformly dispersed in the resin is easily obtained by using the paper wetted with the water.

According to the production method described above, in a case where a beverage pack and/or a food pack, or a cellulose-fiber-adhering polyolefin thin film piece obtainable by treating these with a pulper is used as a raw material, a polyolefin resin and/or a resin other than that may be added separately before or after melt-kneading, in addition to the polyolefin resin of the cellulose-fiber-adhering polyolefin thin film piece. The contents of these components in the resulting composite material are as described above.

According to the production method described above, in a case where a beverage pack and/or a food pack, or a cellulose-fiber-adhering polyolefin thin film piece obtainable by treating these with a pulper is used as a raw material, as the beverage pack or food pack, a used pack, an unused pack, a portion of an unused pack generated in the production process for the pack, or the like can be utilized. When the used beverage pack or food pack is recovered and used, a resin component other than the polyolefin resin is mixed in the recovered material in several cases. In particular, mixing of polyethylene terephthalate, nylon, and the like may be exemplified. The composite material obtained by the production method described above can contain such a resin other than the polyolefin resin. The composite material obtained by the production method described above can contain polyethylene terephthalate and/or nylon in a total amount of 10 mass parts or less based on the total content of 100 mass parts of the polyolefin resin and the cellulose fiber, for example.

According to the production method described above, the composite material of the present invention can be obtained by using a polyolefin laminated paper, a beverage pack and/or a food pack formed from a polyolefin laminated paper, or a cellulose-fiber-adhering polyolefin thin film piece obtainable by treating these materials with a pulper, as a raw material. That is, since useless waste materials that are disposed of by being buried like so-called garbage can be utilized, the raw material cost of the composite material of the present invention is inexpensive. Furthermore, the present invention is an invention that can also contribute to a reduction of environmental burden.

EXAMPLES

The present invention will be described in more detail based on examples given below, but the invention is not meant to be limited by these.

A measuring method and an evaluation method for each indicator in the present invention are as follows.

Abrasion Resistance

A specimen was produced by press processing using a composite material, and abrasion resistance was evaluated according to a reciprocation method of the abrasion resistance test of ISO6722 using a needle as an abrader. The amount of abrasion after 5,000 reciprocations under the following testing conditions (depth in a direction perpendicular to the specimen surface (thickness direction), of a scratch formed by reciprocation of the needle) was designated as the amount of abrasion according to the present test.
Load: 1.7 kg
Needle diameter: φ0.45 mm
Needle material: SUS304
Stroke length: 10 mm
Period: 60 reciprocations/min
Specimen: length 38 mm×width 6 mm×thickness 1 mm (a flat plate-like sheet having a rectangular cross-section)
Room temperature: 23° C.

Cellulose Effective Mass Ratio

A sample (10 mg) formed in a dry state by drying the composite material sample at 80° C. for 1 hour in advance in an ambient atmosphere was used, and based on the results obtained by performing a thermogravimetric analysis (TGA) from 23° C. to 400° C. at a heating rate of +10° C./min under a nitrogen atmosphere, a cellulose effective mass ratio was determined according to the following formula. Measurement was performed 5 times and an average value thereof was determined, and the average value was taken as the cellulose effective mass ratio.

(Cellulose effective mass ratio [%])=(loss of mass [mg] from 270° C. to 390° C. of the composite material sample)×100/(mass [mg] of the composite material sample in a dry state before being provided for the thermogravimetric analysis)

Conformance or Nonconformance of Abrasion Resistance 1

A case where the amount of abrasion satisfies the following evaluation formula [Formula 1] was deemed as conformance (○), and a case where the amount of abrasion does not satisfy the expression was deemed as nonconformance (x).

(Amount of abrasion [mm] of the cellulose-fiber-dispersing polyolefin resin composite material)<−0.003×(Cellulose effective mass ratio of the cellulose-fiber-dispersing polyolefin resin composite material)+0.3  [Formula 1]

Conformance or Nonconformance of Abrasion Resistance 2

A case where the amount of abrasion satisfies the following evaluation formula [Formula 2] was deemed as conformance (○), and a case where the amount of abrasion does not satisfy the expression was deemed as nonconformance (x).

(Amount of abrasion [mm] of the cellulose-fiber-dispersing polyolefin resin composite material)/(Amount of abrasion [mm] of simple substance of the polyolefin resin composing the cellulose-fiber-dispersing polyolefin resin composite material [mm])<−0.01×(Cellulose effective mass ratio of the cellulose-fiber-dispersing polyolefin resin composite material)+1  [Formula 2]

Regarding the amount of abrasion of the simple substance of the polyolefin resin, pellets formed from the same polyolefin resin as the polyolefin resin that constituted the cellulose-fiber-dispersing polyolefin resin composite material were kneaded with a roll and then pressed to produce a specimen of the simple substance of the polyolefin resin, an abrasion resistance test was carried out as described above, and thus the amount of abrasion of the simple substance of the polyolefin resin was determined.

Shape of Resulting Material (Cellulose-Fiber-Dispersing Polyolefin Resin Composite Material)

An appearance of a cellulose-fiber-dispersing polyolefin resin composite material after kneading was evaluated through visual inspection. A material in a state of bulk was deemed as a conformance product (○); and a material not in a state of bulk but in a powder shape was deemed as a nonconformance product (x). (The material in the powder shape causes bridging or adhesion to a vessel wall surface for the reason of easily absorbing moisture in air due to small bulk density, and is difficult in charging into a molding machine by self-weight fall upon subsequent molding.)

Cellulose Fiber Dispersibility

A composite material which was dried by a hot air dryer at 80° C. in advance until a moisture content was reduced to 0.5 mass % or less was molded into a sheet form having a dimension of 100 mm×100 mm×1 mm by a press to obtain a formed body. This formed body was immersed into water at 80° C. for 20 days, and then a square having a size of 40 mm×40 mm was drawn in an arbitrary place on a surface of the formed body removed from warm water, and further 9 line segments having a length of 40 mm were drawn inside the square at an interval of 4 mm. Roughness on an intermediate line between adjacent two line segments was measured under conditions of cut-off value $\lambda c=8.0$ mm and $\lambda s=25.0$ μm by using a surface roughness measuring instrument to obtain 10 lines of roughness curves (specified by JIS B 0601; evaluation length: 40 mm). When the number of mountains having a peak top of 30 μm or more and being convex upward (from the surface toward an outside) was counted in all of 10 lines of the roughness curves, a case where the number of mountains is 20 or more in total was deemed as a nonconformance product (x), and a case where the number of mountains is less than 20 was deemed as a conformance product (○).

When the cellulose fibers are unevenly distributed in the sample, water absorption is locally caused, and the surface in the portion swells. Therefore, cellulose fiber dispersibility can be evaluated by this method.

Flexural Strength

A test piece (thickness: 4 mm, width: 10 mm, and length: 80 mm) was prepared by injection molding, a load was applied to the test piece with a span between specimen supports of 64 mm, a curvature radius of 5 mm at a supporting point and an action point, and a test speed of 2 mm/min, and flexural strength was calculated in accordance with JIS K 7171. A unit of the flexural strength is "MPa".

Flexural Modulus

Flexural modulus was measured on a 4 mm-thick sample at a flexural rate of 2 mm/min in accordance with JIS K 7171. More specifically, a test piece (thickness: 4 mm, width: 10 mm, and length: 80 mm) was prepared by injection molding, a load was applied to the test piece with a span between specimen supports of 64 mm, a curvature radius of 5 mm at a supporting point and an action point, and a test speed of 2 mm/min, and a flexural test was conducted in accordance with JIS K 7171, and flexural modulus was determined.

Here, the flexural modulus Ef can be determined by determining flexural stress σf1 measured at a deflection amount in strain 0.0005 (εf1) and flexural stress σf2 measured at a deflection amount in strain 0.0025 (εf2), and dividing a difference therebetween by a difference between respective amounts of strain corresponding thereto, namely, according to the following formula:

$$Ef=(\sigma f2-\sigma f1)/(\varepsilon f2-\varepsilon f1).$$

In this case, the deflection amount S for determining the flexural stress can be determined according to the following formula: $S=(\varepsilon \cdot L^2)/(6 \cdot h)$, where, S is deflection,
ε is flexural strain,
L is span between specimen supports, and
h is thickness.

In the following description, a polyolefin laminated paper in which the polyolefin resin was a polyethylene resin was referred to as "polyethylene laminated paper", and a cellulose-fiber-adhering polyolefin thin film piece in which the polyolefin resin was a polyethylene resin was referred to as "cellulose-fiber-adhering polyethylene thin film piece".

Example 1

A cellulose-fiber-adhering polyethylene thin film piece was obtained by stripping off and removing, by using a pulper, a paper portion from a beverage container made of paper as formed of polyethylene laminated paper (constitution: paper 80 mass %, low density polyethylene 20 mass %). This thin film piece was cut into small pieces having various shapes and sizes of about several $cm^2$ to 100 $cm^2$, and was in a wet state (state in which a large amount of water was absorbed) by being immersed into water in a step of stripping off the paper portion. Furthermore, the contents (contents in a thin film piece in a dry state) of the polyethylene resin composing this thin film piece and the cellulose fibers adhering thereto as measured by the above-described measurement method were as shown in Table 1. Meanwhile, the content (mass %) of the cellulose fiber in Table 1 is the same as the cellulose effective mass ratio (%) (hereinafter, the same). In this thin film piece in the wet state, an amount of water adhered thereto was 100 mass parts based on 100 mass parts (dry mass) of the thin film piece.

Next, this cellulose-fiber-adhering polyethylene thin film piece was charged into a kneader being a batch type kneading device with keeping the wet state, and melt kneaded to prepare a cellulose-fiber-dispersing polyolefin resin composite materials. The resulting composite material was composed of the cellulose fiber and the polyethylene resin, and had the moisture content of less than 1 mass %.

The evaluation results of the composite material are shown in Table 1.

Examples 2 and 3

Each of cellulose-fiber-adhering polyethylene thin film pieces was obtained in the same manner as in Example 1 from a polyethylene laminated paper. As also in Example 1, this thin film piece was cut into small pieces having sizes of about several $cm^2$ to 100 $cm^2$, and was in a wet state. Furthermore, the contents (contents in a thin film piece in a dry state) of the polyethylene resin composing this thin film piece and the cellulose fibers adhering thereto as measured by the above-described measurement method were as shown in Table 1. In this thin film piece in the wet state, an amount of water adhered thereto based on 100 mass parts (dry mass) of the thin film piece is show in Table 1.

Next, this cellulose-fiber-adhering polyethylene thin film piece was charged into the same kneader as in Example 1 with keeping the wet state, and melt kneaded to prepare a cellulose-fiber-dispersing polyolefin resin composite materials. The resulting composite material was composed of the cellulose fiber and the polyethylene resin, and had the moisture content of less than 1 mass %.

Example 4

A cellulose-fiber-adhering polyethylene thin film piece was obtained in the same manner as in Example 1 from a polyethylene laminated paper. As also in Example 1, this thin film piece was cut into small pieces having sizes of about several $cm^2$ to 100 $cm^2$, and was in a wet state. Furthermore, the contents (contents in a thin film piece in a dry state) of the polyethylene resin composing this thin film piece and the cellulose fibers adhering thereto as measured by the above-described measurement method were as shown in Table 1. In this thin film piece in the wet state, an amount of water adhered thereto based on 100 mass parts (dry mass) of the thin film piece is show in Table 1.

Next, this cellulose-fiber-adhering polyethylene thin film piece was charged into a batch type closed kneading device with keeping the wet state, and agitated with a high speed by adjusting a peripheral speed at a leading edge of an stirring blade of the mixing and melting device to 40 m/sec to turn water into a subcritical state, and simultaneously were kneaded to prepare a cellulose-fiber-dispersing polyolefin resin composite materials.

In addition, with regard to a kneading end time point by using the batch type closed kneading device, rotating torque of a rotary shaft of the batch type closed kneading device rises and reaches a maximum value and then falls, and then a torque change is reduced, and therefore a time point at which a torque change rate reaches 5% or less per second is taken as a starting point is defined as a moment at which the torque reached a minimum value, and an elapsed time from this starting point was adjusted to 5 seconds. Furthermore, the peripheral speed of the leading edge of the stirring blade of the mixing melting device was set to 40 m/sec as described above.

The resulting composite material was composed of the cellulose fiber and the polyethylene resin, and had the moisture content of less than 1 mass %.

The evaluation results of each composite material are shown in Table 1.

Comparative Example 1

Low density polyethylene was used as a test sample without adding any cellulose fiber. As the low density polyethylene, LC600A manufactured by Japan Polyethylene Corporation was used. The resulting composite material was made of polyethylene resin.

Comparative Example 2

A polyethylene laminated paper from which a paper portion was not removed at all was cut out and was caused to absorb water, and this was used as a comparative material. For this comparative material in a wet state, the amount of adhering water with respect to 100 mass parts (dry mass) of the comparative material was 100 mass parts. The comparative material in a wet state was introduced in the same batch type closed kneading device as that used in Example 4, melt-kneading was performed in the same manner as in Example 4, and a cellulose-fiber-dispersing polyolefin resin composite material was attempted. However, the melt-kneaded product became a powder, and a desired bulk composite material could not be obtained.

Comparative Example 3

A cellulose-fiber-adhering polyethylene thin film piece was obtained in the same manner as in Example 1 from a polyethylene laminated paper. As also in Example 1, this thin film piece was cut into small pieces having sizes of about several $cm^2$ to 100 $cm^2$, and was in a wet state. Furthermore, the contents (after drying) of the polyethylene resin composing this thin film piece and the cellulose fibers adhering thereto were shown in Table 1. In this thin film piece in the wet state, an amount of water adhered thereto based on 100 mass parts (dry mass) of the thin film piece was 100 mass parts.

This cellulose-fiber-adhering polyethylene thin film piece was dried for 48 hours in a dryer set at 80° C., and thereby the amount of adhering water with respect to 100 mass parts (dry mass) of the thin film piece was adjusted to a level less than 1 mass part.

Next, this cellulose-fiber-adhering polyethylene thin film piece was charged into a kneader being a batch type kneading device, and melt kneaded to prepare a cellulose-fiber-dispersing polyolefin resin composite material. The resulting composite material was composed of the cellulose fiber and the polyethylene resin, and had the moisture content of less than 1 mass %.

The evaluation results of the composite material are shown in Table 1.

TABLE 1

|  | Ex. 1 | Ex. 2 | Ex. 3 | Ex. 4 | CEx. 1 | CEx. 2 | CEx. 3 |
|---|---|---|---|---|---|---|---|
| Cellulose fiber (mass %) | 32 | 5 | 36 | 32 | — | 80 | 32 |
| Polyethylene resin (mass %) | 68 | 95 | 64 | 68 | 100 | 20 | 68 |
| Adhering water (mass parts) | 100 | 100 | 67 | 100 | — | 100 | <1 |
| Shape of resulting material | ○ | ○ | ○ | ○ | — | x | ○ |
| Cellulose fiber dispersibility | ○ | ○ | ○ | ○ | — | — | x |
| Amount of abrasion (mm) of composite material | 0.050 | 0.154 | 0.041 | 0.051 | 0.317 | — | 0.23 |
| Amount of abrasion (mm) of simple substance of polyolefin resin | 0.317 | 0.317 | 0.317 | 0.317 | 0.317 | — | 0.317 |
| Conformance or nonconformance of abrasion resistance 1 | ○ | ○ | ○ | ○ | x | — | x |
| Flexural strength (MPa) | 29.1 | 13.1 | 32.1 | 31.4 | — | — | 27.4 |
| Flexural modulus (MPa) | 2078 | 409 | 2155 | 1981 | — | — | 2053 |
| Conformance or nonconfonnance of abrasion resistance 2 | ○ | ○ | ○ | ○ | x | — | x |

Remarks: 'Ex.' means Example according to this invention, and 'CEx.' means Comparative Example.

As shown in Table 1, it can be seen that composite materials including a particular amount of the cellulose fiber, which were obtained by performing melt-kneading in the presence of water, had excellent abrasion resistance. Furthermore, as the amount of the cellulose fiber was larger, the flexural strength tended to increase. In Comparative Example 2 in which the amount of the cellulose fiber in the composite material was larger than the requirement of the present invention, a bulk composite material could not be obtained, and an abrasion resistance test could not be carried out. Furthermore, the material of Comparative Example 1 formed from polyethylene only had poor abrasion resistance compared to the materials of Example 1 to Example 4. The composite material of Comparative Example 3 obtained by drying a cellulose-fiber-adhering polyethylene thin film piece to adjust the amount of adhering water to a level less than 1 mass part and performing melt-kneading, had both poor dispersibility of the cellulose fiber and poor abrasion resistance compared to the materials of Example 1 to Example 4.

Examples 5, 6 and 7

A cellulose-aluminum-adhering polyethylene thin film piece was obtained by stripping off and removing, by using a pulper, a part of paper portion from a polyethylene laminated paper having an aluminum thin film layer of a used beverage container (the polyethylene was a low density polyethylene). This thin film piece was cut into small pieces having various shapes and sizes of about several $cm^2$ to 100 $cm^2$, and was in a wet state (state in which a large amount of water was absorbed) by being immersed into water in a step of stripping off the paper portion. Furthermore, the contents (contents in a thin film piece in a dry state) of the polyethylene resin composing this thin film piece and the cellulose fibers adhering thereto as measured by the above-described measurement method were as shown in Table 2. Furthermore, the contents (after dried) of aluminum and ash (inorganic materials other than aluminum) are also shown in Table 2. In this thin film piece in the wet state, an amount of water adhered thereto based on 100 mass parts (dry mass) of the thin film piece are shown in Table 2.

Next, this thin film piece was charged into the same kneader as in Example 1 with keeping the wet state, and melt kneaded to prepare cellulose-fiber-dispersing polyolefin resin composite materials. The resulting composite materials were composed of the cellulose fiber, the polyethylene resin, aluminum and ash, and had the moisture content of less than 1 mass %.

The evaluation results of the composite materials are shown in Table 2.

TABLE 2

|  | Example 5 | Example 6 | Example 7 |
|---|---|---|---|
| Cellulose fiber (mass %) | 4 | 26 | 47 |
| Polyethylene resin (mass %) | 81 | 48 | 24 |
| Aluminum (mass %) | 10 | 21 | 3 |
| Ash (mass %) | 5 | 5 | 26 |
| Adhering water (mass parts) | 100 | 100 | 100 |
| Shape of resulting material | ○ | ○ | ○ |
| Cellulose fiber dispersibility | ○ | ○ | ○ |
| Amount of abrasion (mm) of composite material | 0.225 | 0.108 | 0.037 |
| Amount of abrasion (mm) of simple substance of polyolefin resin | 0.317 | 0.317 | 0.317 |
| Conformance or nonconformance of abrasion resistance 1 | ○ | ○ | ○ |
| Conformance or nonconformance of abrasion resistance 2 | ○ | ○ | ○ |

As shown in Table 2, it can be seen that composite materials including aluminum and a particular amount of the cellulose fiber, which were obtained by performing melt-kneading in the presence of water, had excellent abrasion resistance.

Examples 8, 9 and 10

Broken paper of a polyethylene laminated paper having an aluminum thin film layer (the polyethylene was a low density polyethylene) was pulverized using a rotary blade type pulverizer (manufactured by Horai Co, Ltd.), and this was mixed with polypropylene 1 (BC6, manufactured by Japan Polypropylene Corporation) and water, at the blending ratios shown in Table 3-1. This mixture was charged into a batch type closed kneading device (batch type high-speed agitating device), and the mixture was melt kneaded in the presence of water by performing agitation with a high speed by adjusting a rotating speed of an stirring blade of the device to 40 m/sec in a peripheral speed at a leading edge of the rotary blade, to prepare a cellulose-fiber-dispersing polyolefin resin composite material.

In addition, with regard to an end of kneading, a time point at which a temperature of the material in a device chamber to be measured by a thermometer installed in the batch type kneading device reached 220° C. was taken as the end.

The each content of the cellulose (mass %), the polyolefin resin (mass %), aluminum and ash in each composite material determined in the above-mentioned method are shown in the upper part of Table 3-2.

The evaluation results of each composite material are shown in Table 3-2.

The obtained composite materials shown in Table 3-2 had the moisture content of 1 mass % or less.

Table 3

TABLE 3-1

|  | Example 8 | Example 9 | Example 10 |
|---|---|---|---|
| Broken paper (mass parts) | 10 | 30 | 60 |
| Polypropylene 1 (mass parts) | 90 | 70 | 40 |
| Water (mass parts) | 10 | 30 | 60 |

TABLE 3-2

|  | Example 8 | Example 9 | Example 10 |
|---|---|---|---|
| Cellulose fiber (mass %) | 5 | 17 | 35 |
| Polyolefin resin (mass %) | 92 | 78 | 54 |
| Aluminum, ash (mass %) | 3 | 5 | 11 |
| Shape of resulting material | ○ | ○ | ○ |
| Cellulose fiber dispersibility | ○ | ○ | ○ |
| Conformance or nonconformance of abrasion resistance 1 | ○ | ○ | ○ |
| Conformance or nonconformance of abrasion resistance 2 | ○ | ○ | ○ |

As shown in Table 3-2, it can be seen that composite materials including aluminum and a particular amount of the cellulose fiber, which were obtained by performing melt-kneading in the presence of water, had excellent abrasion resistance.

Having described our invention as related to the present embodiments, it is our intention that the invention not be limited by any of the details of the description, unless otherwise specified, but rather be construed broadly within its spirit and scope as set out in the accompanying claims.

The invention claimed is:

1. A cellulose-fiber-dispersing polyolefin resin composite material, comprising:
a polyolefin resin;
a cellulose fiber dispersed in the polyolefin resin, and aluminum dispersed in the polyolefin resin,
wherein the content of the cellulose fiber is 3 mass % or more and less than 70 mass %, and
wherein when the composite material is subjected to the abrasion test according to ISO 6722 under the following test conditions, the amount of abrasion after 5,000 reciprocations satisfies the following formula:

(Amount of abrasion [mm] of the cellulose-fiber-dispersing polyolefin resin composite material)<−0.003×(Cellulose effective mass ratio of the cellulose-fiber-dispersing polyolefin resin composite material)+0.3, [Formula 1]

[Test conditions for abrasion test]
Load: 1.7 kg, Needle diameter: φ0.45 mm, Stroke length: 10 mm, Period: 60 reciprocations/min, Test piece: length 38 mm×width 6 mm×thickness 1 mm, Temperature: 23° C.

2. The cellulose-fiber-dispersing polyolefin resin composite material according to claim 1, wherein the content of the cellulose fiber in the cellulose-fiber-dispersing polyolefin resin composite material is 5 mass parts or more and less than 50 mass parts.

3. The cellulose-fiber-dispersing polyolefin resin composite material according to claim 1, wherein the cellulose fiber comprises a cellulose fiber having a fiber length of 0.3 mm or more.

4. The cellulose-fiber-dispersing polyolefin resin composite material according to claim 1, wherein a moisture content is less than 1 mass %.

5. The cellulose-fiber-dispersing polyolefin resin composite material according to claim 1, wherein the polyolefin resin is a polyethylene resin.

6. The cellulose-fiber-dispersing polyolefin resin composite material according to claim 5, wherein the polyethylene resin is a low density polyethylene resin.

7. The cellulose-fiber-dispersing polyolefin resin composite material according to claim 1, wherein the polyolefin resin is a polypropylene resin.

8. The cellulose-fiber-dispersing polyolefin resin composite material according to claim 1, wherein a content of the aluminum in the cellulose-fiber-dispersing polyolefin resin composite material is 1 mass % or more and 30 mass % or less.

9. The cellulose-fiber-dispersing polyolefin resin composite material according to claim 1, comprising polyethylene terephthalate and/or nylon,
wherein a total content of the polyethylene terephthalate and/or the nylon is 10 mass parts or less based on a total content of 100 mass parts of the polyolefin resin and the cellulose fiber.

10. The cellulose-fiber-dispersing polyolefin resin composite material according to claim 1, wherein at least a part of the polyolefin resin and the cellulose is derived from at least one of (i) a polyolefin laminated paper having paper and a polyolefin thin film layer; (ii) a polyolefin laminated paper having paper, a polyolefin thin film layer and an aluminum thin film layer; (iii) a cellulose-fiber-adhering polyolefin thin film piece; and (iv) a cellulose-fiber-aluminum-adhering polyolefin thin film piece.

11. A cellulose-fiber-dispersing polyolefin resin composite material, comprising:
a polyolefin resin;
a cellulose fiber dispersed in the polyolefin resin, and aluminum dispersed in the polyolefin resin, wherein the content of the cellulose fiber is 3 mass % or more and less than 70 mass %, and wherein when the composite material is subjected to the abrasion test according to ISO 6722 under the following test conditions, the amount of abrasion after 5,000 reciprocations satisfies the following formula:

$$\text{(Amount of abrasion [mm] of the cellulose-fiber-dispersing polyolefin resin composite material)} / \text{(Amount of abrasion [mm] of simple substance of the polyolefin resin composing the cellulose-fiber-dispersing polyolefin resin composite material [mm])} < -0.01 \times \text{(Cellulose effective mass ratio of the cellulose-fiber-dispersing polyolefin resin composite material)} + 1, \quad \text{[Formula 2]}$$

[Test conditions for abrasion test]
Load: 1.7 kg, Needle diameter: φ0.45 mm, Stroke length: 10 mm, Period: 60 reciprocations/min, Test piece: length 38 mm×width 6 mm×thickness 1 mm, Temperature: 23° C.

12. The cellulose-fiber-dispersing polyolefin resin composite material according to claim 11, wherein a moisture content is less than 1 mass %.

13. The cellulose-fiber-dispersing polyolefin resin composite material according to claim 11, wherein the polyolefin resin is a polyethylene resin.

* * * * *